United States Patent
Plag

(10) Patent No.: US 10,186,877 B2
(45) Date of Patent: Jan. 22, 2019

(54) BATTERY CONTROLLER FOR MULTIPLE BATTERY TECHNOLOGIES

(71) Applicant: Lockheed Martin Corporation, Bethesda, MD (US)

(72) Inventor: Kenneth F. Plag, Benbrook, TX (US)

(73) Assignee: Lockheed Martin Corporation, Bethesda, MD (US)

(*) Notice: Subject to any disclaimer, the term of this patent is extended or adjusted under 35 U.S.C. 154(b) by 126 days.

(21) Appl. No.: 15/458,467

(22) Filed: Mar. 14, 2017

(65) Prior Publication Data
US 2018/0269693 A1    Sep. 20, 2018

(51) Int. Cl.
*B60L 1/00*  (2006.01)
*H02J 7/00*  (2006.01)
*B64D 43/00*  (2006.01)

(52) U.S. Cl.
CPC ............ *H02J 7/0004* (2013.01); *H02J 7/007* (2013.01); *B64D 43/00* (2013.01)

(58) Field of Classification Search
CPC .................................................. H02J 7/0004
See application file for complete search history.

(56) References Cited

U.S. PATENT DOCUMENTS

| | | |
|---|---|---|
| 3,696,283 A | 10/1972 | Ackley, III |
| 4,709,202 A | 11/1987 | Koenck et al. |
| 5,144,218 A | 9/1992 | Bosscha |
| 5,187,422 A | 2/1993 | Izenbaard et al. |
| 5,455,499 A | 10/1995 | Uskali et al. |
| 5,463,305 A | 10/1995 | Koenck |
| 5,523,668 A | 6/1996 | Feldstein |
| 5,543,702 A | 8/1996 | Pfeiffer |
| 5,565,756 A * | 10/1996 | Urbish ............... H01M 6/5033 320/103 |
| 5,592,064 A | 1/1997 | Morita |
| 5,619,117 A | 4/1997 | Koenck |
| 5,729,115 A | 3/1998 | Wakefield |
| 5,744,937 A | 4/1998 | Cheon |
| 5,818,197 A | 10/1998 | Miller et al. |
| 5,831,350 A | 11/1998 | McConkey et al. |
| 6,204,632 B1 | 3/2001 | Nierescher et al. |
| 6,291,966 B1 | 9/2001 | Wendelrup et al. |

(Continued)

FOREIGN PATENT DOCUMENTS

GB    2 419 243 A    4/2006

*Primary Examiner* — Jared Fureman
*Assistant Examiner* — Duc M Pham
(74) *Attorney, Agent, or Firm* — Baker Botts L.L.P.

(57) ABSTRACT

An apparatus comprises an interface configured to communicate with a first battery of a first battery type and a second battery of a second battery type. The apparatus comprises processing circuitry configured to: obtain first parameters related to at least one first characteristic of the first battery, the one or more first parameters stored in a universal format that is implemented by both the first battery and the second battery; perform one or more first charging operations for the first battery based on the obtained one or more first parameters; obtain one or more second parameters related to at least one second characteristic of the second battery, the one or more second parameters stored in the universal format; and perform one or more second charging operations for the second battery based on the obtained one or more second parameters.

20 Claims, 3 Drawing Sheets

(56) References Cited

U.S. PATENT DOCUMENTS

| | | | |
|---|---|---|---|
| 7,880,445 B2 | 2/2011 | Hussain et al. | |
| 9,184,603 B2* | 11/2015 | Lee | H02J 7/0003 |
| 2007/0120524 A1* | 5/2007 | Shum | H02J 7/0003 |
| | | | 320/106 |
| 2013/0234655 A1* | 9/2013 | Miwa | H02J 7/0004 |
| | | | 320/107 |
| 2015/0171632 A1* | 6/2015 | Fry | H02J 7/0004 |
| | | | 307/22 |
| 2018/0090942 A1* | 3/2018 | Nunez | H02J 7/007 |

* cited by examiner

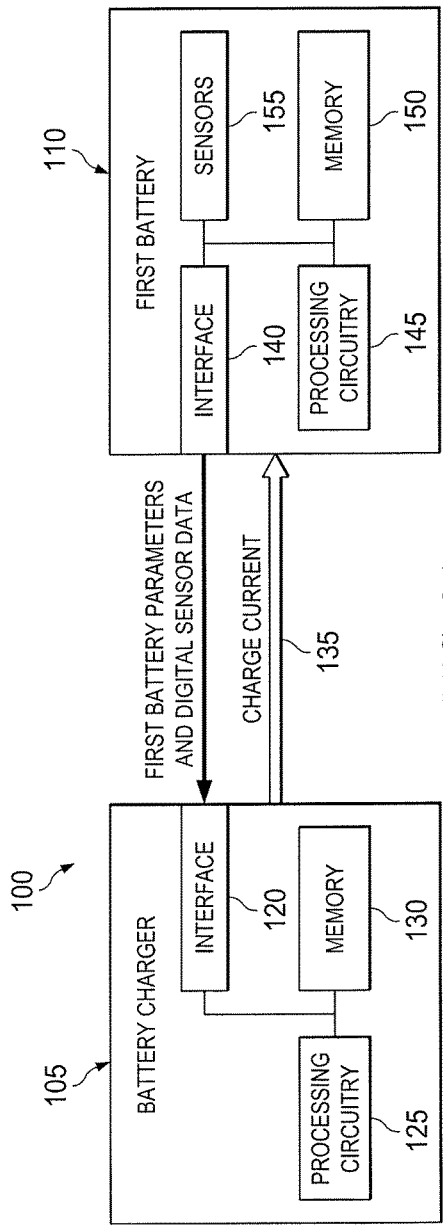
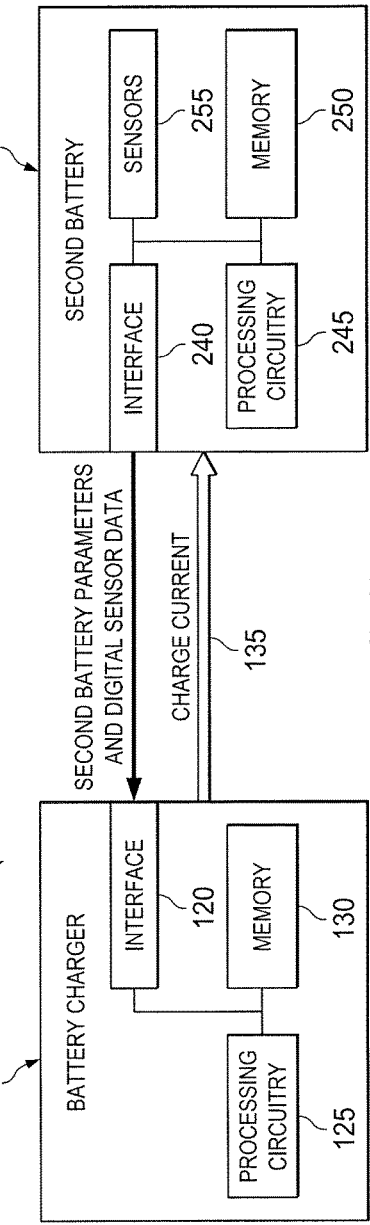
FIG. 2A
FIG. 2B

BATTERY CONTROLLER FOR MULTIPLE BATTERY TECHNOLOGIES

TECHNICAL FIELD

The present disclosure relates in general to battery controllers, and more particularly to a battery controller for multiple battery technologies.

BACKGROUND

Battery technology is changing rapidly. New battery chemistries are being developed at an accelerating rate. Each chemistry requires a specific charging algorithm to maximize the life and capacity of the cells and minimize the time it takes to recharge the battery. Significant investments are often made in developing a battery charger to optimize the performance of the battery. The charger, however, is designed to handle only a single type of battery. This can result in significant problems when a new type of battery is introduced.

SUMMARY

According to embodiments of the present disclosure, disadvantages and problems associated with previous techniques for charging batteries may be reduced or eliminated.

According to one example embodiment, a system is disclosed. The system comprises a battery controller and a first battery. The battery controller comprises a first interface configured to communicate with a first battery of a first battery type having an associated first charging algorithm and a second battery of a second, different battery type having an associated second charging algorithm. The battery controller comprises first processing circuitry. The first processing circuitry is configured to obtain, via the first interface, one or more first parameters related to at least one first characteristic of the first battery. The first processing circuitry is configured to perform one or more first charging operations based on the obtained one or more first parameters related to the at least one first characteristic of the first battery. The first battery comprises one or more first memory devices configured to store the one or more first parameters related to the at least one first characteristic of the first battery, the one or more first parameters stored in a universal format that is implemented by both the first battery and the second battery. The first battery comprises second processing circuitry. The second processing circuitry is configured to monitor the at least one first characteristic of the first battery using one or more sensors. The second processing circuitry is configured to store the one or more first parameters related to the at least one first characteristic of the first battery in the one or more first memory devices. The first battery comprises a second interface communicatively coupled to the one or more first memory devices and the second processing circuitry. The second interface is configured to communicate with the battery controller.

According to another example embodiment, an apparatus is disclosed. The apparatus comprises an interface configured to communicate with a first battery of a first battery type having an associated first charging algorithm and a second battery of a second battery type having an associated second charging algorithm. The apparatus comprises processing circuitry. The processing circuitry is configured to obtain, via the interface, one or more first parameters related to at least one first characteristic of the first battery, the one or more first parameters related to the at least one first characteristic of the first battery stored in one or more first memory devices of the first battery in a universal format that is implemented by both the first battery and the second battery. The processing circuitry is configured to perform one or more first charging operations for the first battery based on the obtained one or more first parameters related to the at least one first characteristic of the first battery. The processing circuitry is configured to obtain, via the interface, one or more second parameters related to at least one second characteristic of the second battery, the one or more second parameters related to the at least one second characteristic of the second battery stored in one or more second memory devices of the second battery in the universal format that is implemented by both the first battery and the second battery. The processing circuitry is configured to perform one or more second charging operations for the second battery based on the obtained one or more second parameters related to the at least one second characteristic of the second battery.

According to another example embodiment, a method is disclosed. The method comprises communicatively coupling a battery controller to a first battery of a first battery type having an associated first charging algorithm via an interface. The method comprises obtaining, by the battery controller, one or more first parameters related to at least one first characteristic of the first battery from one or more first memory devices of the first battery, the one or more first parameters related to the at least one first characteristic of the first battery stored in a universal format that is implemented by both the first battery and a second battery of a second battery type having an associated second battery charging algorithm. The method comprises performing, by the battery controller, one or more first charging operations for the first battery based on the obtained one or more first parameters related to the at least one first characteristic of the first battery.

Certain embodiments of the present disclosure may provide one or more technical advantages. As one example, certain embodiments may allow batteries of different types to be maintained by a single battery controller without modification to the battery controller. As another example, certain embodiments may allow updates to battery technologies without impacting the battery controller. This may advantageously allow battery types to be upgraded without the cost of retrofitting existing equipment to accommodate the new battery types. As still another example, certain embodiments may enable a standardized format to be used that is applicable to any platform, including current and future battery technology. As yet another example, certain embodiments may, as new battery technologies are developed, allow parameters for the new technology to be loaded into memory devices of the battery, allowing it to be optimally maintained by the battery controller. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIGS. 2A and 2B illustrate schematic diagrams of a battery charger configured to operate with a first battery of a first type and a second battery of a second, different type, in accordance with certain embodiments.

DETAILED DESCRIPTION

Figure 1:
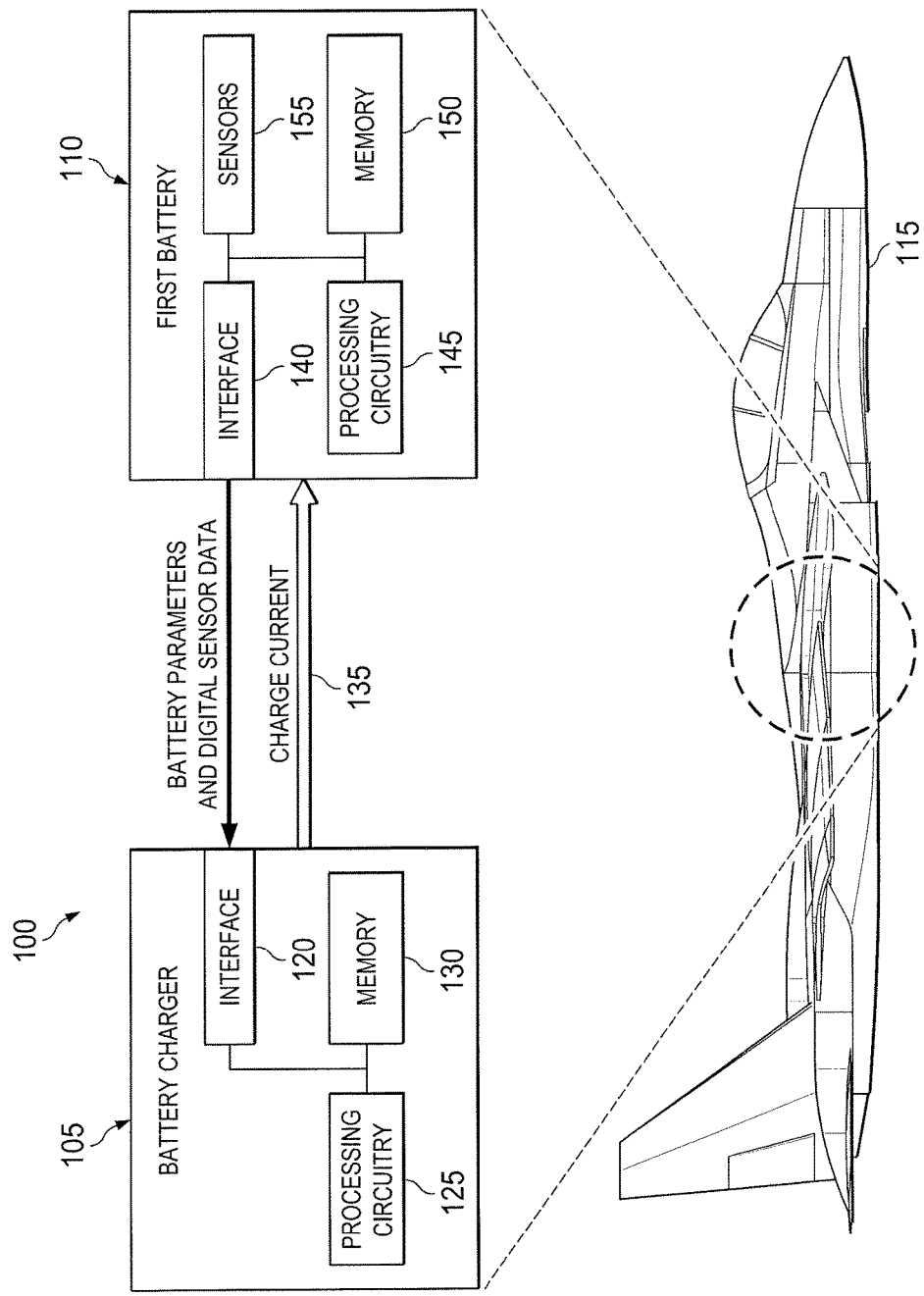
FIG. 1 illustrates a schematic diagram of an example charging system, in accordance with certain embodiments.

As described above, battery technology is changing rapidly. New battery chemistries are being developed at an accelerating rate. Each chemistry requires a specific charging algorithm to maximize the life and capacity of the cells and minimize the time it takes to recharge the battery. Significant investments are often made in developing a battery charger to optimize the battery's performance. Generally, however, the charger is designed to handle only a single type of battery. This can result in significant problems when a new type of battery is introduced.

For example, in the aircraft industry (or other industries), significant investments are made in developing a battery charger to optimize performance of a battery, but the charger is designed to handle only one type of battery. Different types of batteries have different characteristics. As one example, different types of batteries have differing cell voltages. Often, a unique number of cells are used to create the battery voltage. The differences in cell quantity and voltage, for example, make it extremely difficult to make a charger capable of handling more than one type of battery.

Typically, charge, discharge, and life parameters for that single battery type are contained within the battery charger's charging algorithm. Upgrading a platform to a new battery chemistry requires a second investment in a new charger algorithm. To upgrade a fleet of platforms requires a significant cost to modify the battery charger simultaneously with the upgrade to the battery. This, in turn, limits the desire to make incremental battery upgrades.

An existing approach combines the battery and battery charger into the same unit, which makes it easier to modify the combined product at the user's level. Modifications, however, are still required at the charger level to implement a new battery technology. In other instances, companies choose to sacrifice performance (either via a shortened battery life, less capacity, or extended recharge time) to make their charger usable on a small number of battery sizes.

The present disclosure contemplates various embodiments that may address these and other deficiencies associated with existing approaches to battery chargers. In certain embodiments, this is achieved by repartitioning the control parameters of the battery charger to be contained within the battery. Thus, any battery, regardless of its chemistry and charge, discharge, or life parameters, can be charged by a common charger. With this repartitioning, when the battery charger is powered up, it will read the necessary parameters (e.g., charge, discharge, and life parameters) from one or more memory devices stored within the battery, and proceed to maintain the battery based on those parameters. The charger is now a generic controller, capable of maintaining a wide variety of batteries based on the data provided within the battery.

As used herein, the term "battery charger" is intended to have broad meaning, and is not limited to an apparatus that charges a battery. Rather, the present disclosure uses the terms "battery charger" to refer broadly to an apparatus capable of controlling and/or managing a battery during all phases of operation, including, for example, charging and discharging (i.e., use) of the battery, maintaining the battery, monitoring the battery, calculating the remaining life of the battery, controlling a battery heater, and any other suitable operations related to the maintenance and operation of a battery. For example, although certain embodiments may be described in terms of a battery charger, the various embodiments described herein are equally applicable to a battery controller. Similarly, although these various functions are generally referred to herein as "charging operations," this term is likewise not limited to the operation of charging a battery and instead refers broadly to any operations related to a battery, including operations related to charging a battery, discharging the battery, or any other suitable operations for using, maintaining, and/or monitoring the condition of the battery.

The use of a generic battery charger that operates based on one or more parameters specified by the battery may advantageously allow a multitude of batteries to be maintained by a single battery charger, without modification to the battery charger. Additionally, there may be no battery charger retrofit cost when a new battery technology is added to a fleet, because it is not necessary to match the battery charger to the battery during an upgrade. As new battery technologies are developed, the parameters for the new battery technology can be loaded into the battery's memory devices, allowing it to be optimally maintained by the generic battery charger.

FIG. 1 illustrates a schematic diagram of an example charging system 100, in accordance with certain embodiments. More particularly, system 100 includes a battery charger 105 and a first battery 110. In the example of FIG. 1, battery charger 105 and first battery 110 are installed in aircraft 115. First battery 110 may be of a first battery type and have an associated first charging algorithm. The first battery type of first battery 110 may be any suitable type of battery, as described in more detail below. Battery charger 105 includes first interface 120, first processing circuitry 125, one or more first memory devices 130, and a charging connection 135. In the example of FIG. 1, first interface 120, first processing circuitry 125, and one or more first memory devices 130 are communicatively coupled. In certain embodiments, battery charger 105 may be a battery controller. First battery 110 includes a second interface 140, second processing circuitry 145, one or more second memory devices 150, and one or more sensors 155. In the example of FIG. 1, second interface 140, second processing circuitry 145, one or more sensors 155 and one or more second memory devices 150 are communicatively coupled.

Although the example of FIG. 1 illustrates battery charger 105 and first battery 110 as components of aircraft 115, the present disclosure is not limited to such an example. Rather, the various embodiments described herein are applicable to any suitable system utilizing a battery and battery charger. In some cases, battery 110 and battery charger 105 may be installed in another type of vehicle (e.g., automobile or train). In some cases, battery 110 and battery charger 105 may be installed in a facility (e.g., business or home). Depending on the implementation, battery 110 and battery charger 105 may be installed together (e.g., as a single unit) or separately. In some cases, battery charger 110 may be portable.

As noted above, battery charger 105 includes first interface 120, first processing circuitry 125, and one or more first memory devices 130. In the example embodiment of FIG. 1, first interface 120 is communicatively coupled to first battery 110. Battery charger 105 is configured to communicate with first battery 110 via first interface 120. For example, in certain embodiments battery charger 105 is configured to obtain, via first interface 120, one or more first parameters related to at least one first characteristic of first battery 110.

Battery charger 105 may obtain the one or more first parameters related to the at least one first characteristic of first battery 110 in any suitable manner. For example, processing circuitry 125 may utilize first interface 120 to read the one or more first parameters from one or more second memory devices 150 of first battery 110. In certain embodiments, first interface 120 may be configured to communicate with a second battery of a second, different battery type having an associated second charging algorithm. Such an arrangement is described in more detail below in relation to FIGS. 2A and 2B.

First interface 120 may be configured to communicate with first battery 110 in any suitable manner using any suitable technology. For example, first interface 120 may be any suitable device operable to receive information from first battery 110, transmit information to first battery 110, perform suitable processing of the received or transmitted information, communicate to other devices (e.g., a second battery of a second battery type), or any combination of the preceding. First interface 120 represents any port or connection, real or virtual, including any suitable hardware and/or software, including protocol conversion and data processing capabilities, to communicate with first battery 110. In certain embodiments, first interface 120 of battery charger 105 may communicate with first battery 110 through a wired, LAN, WAN, or other communication systems that allows battery charger 105 to exchange information with first battery 110 (e.g., battery parameters and digital sensor data). As a particular example, first interface 120 may be communicatively coupled to second interface 140 of first battery 110 over a bus. Other implementations are possible.

In the example of FIG. 1, first processing circuitry 125 is communicatively coupled to first interface 120 and one or more first memory devices 130. First processing circuitry 125 of battery charger 105 may be configured to perform any suitable operations of battery charger 105. As noted above, for example, first processing circuitry 125 is configured to obtain, via first interface 120, one or more first parameters related to at least one first characteristic of battery 110. The one or more first parameters may be any suitable parameters or information. For example, in certain embodiments the one or more first parameters may comprise one or more of a charge parameter, a discharge parameter, and a battery life parameter. In certain embodiments, first processing circuitry 125 may be configured to verify the one or more first parameters related to the at least one first characteristic of the first battery.

First processing circuitry 125 is configured to perform one or more first charging operations based on the obtained one or more first parameters related to the at least one first characteristic of first battery 110. In certain embodiments, first processing circuitry 125 is further configured to obtain, via first interface 120, one or more second parameters related to at least one second characteristic of a second battery of a second, different battery type and perform one or more second charging operations for the second battery without requiring modification to battery charger 105. Such an embodiment is described in more detail below in relation to FIGS. 2A and 2B.

First processing circuitry 125 is any electronic circuitry, including, but not limited to microprocessors, application specific integrated circuits (ASIC), application specific instruction set processor (ASIP), and/or state machines, that communicatively couples to first interface 120 and one or more first memory devices 130 and controls the operation of battery charger 105. First processing circuitry 125 may be 8-bit, 16-bit, 32-bit, 64-bit or of any other suitable architecture. First processing circuitry 125 may include an arithmetic logic unit (ALU) for performing arithmetic and logic operations, processor registers that supply operands to the ALU and store the results of ALU operations, and a control unit that fetches instructions from one or more memory devices 130 and executes them by directing the coordinated operations of the ALU, registers and other components. First processing circuitry 125 may include other hardware and software that operates to control and process information. First processing circuitry 125 executes software stored on one or more memory devices 130 to perform any of the functions of battery charger 105 described herein. First processing circuitry 125 controls the operation and administration of battery charger 105 by processing information received via first interface 120 (e.g., one or more first parameters related to at least one first characteristic of first battery 110) and/or one or more first memory devices 150. First processing circuitry 125 may be a programmable logic device, a microcontroller, a microprocessor, any suitable processing device, or any suitable combination of the preceding. First processing circuitry 125 is not limited to a single processing device and may encompass multiple processing devices.

One or more first memory devices 130 may be any suitable type of memory. One or more first memory devices 130 may store, either permanently or temporarily, data, operational software, or other information for first processing circuitry 125. First memory 130 may include any one or a combination of volatile or non-volatile local or remote devices suitable for storing information. For example, first memory 130 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in first memory 130, a disk, a compact disc (CD), or a flash drive. In particular embodiments, the software may include an application executable by first processing circuitry 125 to perform one or more of the functions of battery charger 105 described herein.

In the example of FIG. 1, first memory 130 may include one or more rules controlling the operation of battery charger 105. For example, first memory 130 may include rules relating to interpreting the one or more first parameters related to the at least one first characteristic of first battery 110 (and, in certain embodiments, these same rules may relate to interpreting one or more second parameters related to at least one second characteristic of a second battery of a second battery type, or any number of batteries of any number of types). As another example, first memory 130 may include rules governing the one or more first charging operations performed by battery charger 105 for first battery 110 based on the obtained one or more first parameters (and, in certain embodiments, rules relating to performing one or more second charging operations for the second battery of the second battery type or any number of batteries of any number of types). These rules generally refer to logic, rules, algorithms, codes, tables, and/or other suitable instructions embodied in a computer-readable storage medium for operation of battery charger 105.

Battery charger 110 includes additional components beyond those shown in the example of FIG. 1. For example, battery charger 110 may include additional components such as a power supply for controlling and delivering charge current, electrical switches and control circuitry for connecting the battery to the load, electrical switches and control circuitry for connecting heater power to the battery, and any other suitable components that allow it to perform the various charging operations described herein. In certain embodiments, these additional components may be known elements of existing battery chargers. In certain embodiments, these additional elements may be aspects of newly developed battery charging technology.

Battery 110 includes second interface 140, second processing circuitry 145, one or more second memory devices 150, and one or more sensors 155. In the example embodiment of FIG. 1, second interface 140 is communicatively coupled to battery charger 105. First battery 110 is configured to communicate with battery charger 105 via second interface 140. For example, in certain embodiments first battery 110 is configured to communicate, via second interface 140, one or more first parameters related to at least one first characteristic of first battery 110.

Second interface 140 may be configured to communicate with battery charger 105 in any suitable manner using any suitable technology. For example, second interface 140 may be any suitable device operable to receive information from battery charger 105, transmit information to battery charger 105, perform suitable processing of the received or transmitted information, communicate to other devices (e.g., another battery charger), or any combination of the preceding. Second interface 140 represents any port or connection, real or virtual, including any suitable hardware and/or software, including protocol conversion and data processing capabilities, to communicate with battery charger 105. In certain embodiments, second interface 140 of first battery 110 may communicate with battery charger 105 through a wired, LAN, WAN, or other communication systems that allows first battery 110 to exchange information with battery charger 105. As a particular example, second interface 140 may be communicatively coupled to first interface 120 of battery charger 105 over a bus. Other implementations are possible.

In the example of FIG. 1, second processing circuitry 145 is communicatively coupled to second interface 140, one or more second memory devices 150, and one or more sensors 155. Second processing circuitry 145 of first battery 110 may be configured to perform any suitable operations of first battery 110. For example, in certain embodiments second processing circuitry 145 of first battery 110 monitors the at least one first characteristic of first battery 110 using one or more sensors 155. Second processing circuitry 145 stores the one or more first parameters related to the at least one first characteristic of first battery 110 in the one or more second memory devices 150. As a further example, in certain embodiments second processing circuitry 145 is configured to periodically store updated values of the one or more first parameters related to the at least one first characteristic of first battery 110 in one or more second memory devices 150. The updated values for the one or more first parameters may reflect a change in the at least one first characteristic of first battery 110. In certain embodiments, first processing circuitry 125 of battery charger 105 may periodically obtain the updated values of the one or more first parameters related to the at least one first characteristic of first battery 110 and modify the one or more first charging operations based on the obtained updated values.

Second processing circuitry 145 is any electronic circuitry, including, but not limited to microprocessors, ASIC, ASIP, and/or state machines, that communicatively couples to second interface 140, one or more second memory devices 150, and one or more sensors 155 and controls the operation of first battery 110. Second processing circuitry 145 may be 8-bit, 16-bit, 32-bit, 64-bit or of any other suitable architecture. Second processing circuitry 145 may include an ALU for performing arithmetic and logic operations, processor registers that supply operands to the ALU and store the results of ALU operations, and a control unit that fetches instructions from one or more second memory devices 150 and executes them by directing the coordinated operations of the ALU, registers and other components. Second processing circuitry 145 may include other hardware and software that operates to control and process information. Second processing circuitry 145 executes software stored on one or more second memory devices 150 to perform any of the functions of battery 110 described herein. Second processing circuitry 145 controls the operation and administration of battery 110, for example by processing information received by one or more sensors 155 and information received from second interface 140 and/or one or more second memory devices 150. Second processing circuitry 145 may be a programmable logic device, a microcontroller, a microprocessor, any suitable processing device, or any suitable combination of the preceding. Second processing circuitry 145 is not limited to a single processing device and may encompass multiple processing devices.

One or more second memory devices 150 may be any suitable type of memory. One or more second memory devices 150 may store, either permanently or temporarily, data, operational software, or other information for second processing circuitry 145. Memory 150 may include any one or a combination of volatile or non-volatile local or remote devices suitable for storing information. For example, memory 150 may include RAM, ROM, magnetic storage devices, optical storage devices, or any other suitable information storage device or a combination of these devices. The software represents any suitable set of instructions, logic, or code embodied in a computer-readable storage medium. For example, the software may be embodied in memory 150, a disk, a CD, or a flash drive. In particular embodiments, the software may include an application executable by second processing circuitry 145 to perform one or more of the functions of first battery 110 described herein.

In the example of FIG. 1, memory 150 may store one or more first parameters related to the at least one first characteristic of first battery 110. For example, memory 150 may store one or more charge parameters, one or more discharge parameters, and one or more battery life parameters for first battery 110. The one or more first parameters may be stored in a universal format that is implemented by batteries of different types, thereby allowing parameters of different types of batteries to be read by battery charger 105 without requiring modification to battery charger 105. Said another way, the one or more parameters may be stored in a generic manner that is not specific to a particular charging algorithm associated with first battery 110.

Additionally, memory 150 may include one or more rules for controlling the operation of first battery 110. For example, memory 150 may include rules relating to interpreting information generated by one or more sensors 155. As another example, memory 150 may include rules governing the operations of second processing circuitry 145. These rules generally refer to logic, rules, algorithms, codes, tables, and/or other suitable instructions embodied in a computer-readable storage medium for operation of battery 110.

One or more sensors 155 may perform any suitable sensing functions for first battery 110. For example, one or more sensors 155 may comprise: one or more temperature sensors that measure temperature; one or more current sensors that measure current; one or more voltage sensors that measure voltage; one or more pressure sensors that measure pressure; one or more strain gauges that measure strain; one or more electrolyte concentration sensors; and any other suitable types of sensors. In certain embodiments, battery life may be sensed based on a combination of one or more outputs of the various sensors described above.

First battery 110 may be configured to provide electricity to one or more components of aircraft 115. First battery 110 may be located in any suitable location of aircraft 115. In certain embodiments, first battery 110 may be co-located with battery charger 105. First battery 110 may be any suitable type of battery. For example, first battery 110 may be at least one of Ni-Cad battery, a lead acid battery, a lithium ion battery, a nickel metal hydride (NiMH) battery, any other suitable type of battery or combination of the above-described battery technologies, and future battery technologies/chemistries. In some cases, first battery may be an alkaline battery. Although alkaline batteries are not generally rechargeable, in certain embodiments battery charger 105 may be used to monitor such an alkaline battery during discharge. In addition to the various elements of first battery 110 illustrated in the example of FIG. 1, first battery 110 may include additional elements necessary for first battery 110 to function as described herein. For example, the present disclosure contemplates that first battery 110 may utilize any suitable battery chemistry type. First battery 110 may include any suitable number of cells.

Generally, in operation battery charger 105 is communicatively coupled to first battery 110 as shown in the example of FIG. 1. A connection is also made through which a current may pass. Battery charger 105 may provide charge current to first battery 110 in any suitable manner, for example via charging connection 135. In certain embodiments, battery charger 105 may charge first battery 110 wirelessly. Battery charger 105, via first interface 120, reads one or more first parameters related to at least one first characteristic of first battery 110. For example, battery charger 105 may read a memory location of memory 150 in first battery 110 to obtain the one or more first parameters related to the at least one first characteristic of first battery 110. In certain embodiments, the one or more first parameters related to the at least one first characteristic of first battery 110 are stored in memory 150 of first battery 110 in a universal format that, for example, is not specific to a first charging algorithm associated with first battery 110.

Battery charger 105 performs one or more charging operations on first battery 110 based on the obtained one or more first parameters related to the at least one first characteristic of first battery 110. The charging operations may be any suitable operations. For example, battery charger 105 may deliver charge current to first battery 110 (e.g., over charging cable 135). As another example, battery charger 105 may determine that first battery 110 needs to be connected to the load and discharged.

The one or more first parameters may be any suitable information. For example, the one or more first parameters may be a charge parameter, a discharge parameter, or a battery life parameter. As described above, in contrast to existing approaches, the various embodiments described herein repartition the control parameters for battery charger 105 to be contained within first battery 110. By storing these parameters in a universal format that can, for example, be used by a second battery of a second, different, battery type, battery charger 105 is able to perform charging operations on different types of batteries without requiring modification to, for example, its software. Thus, any battery, regardless of its chemistry and charge, discharge, or life parameters, can be charged by battery charger 105. Battery charger 105 can be thought of as a generic controller, capable of maintaining a wide variety of batteries, including first battery 110, based on the data provided within first battery 110.

For purposes of example, a comparison of an existing approach to battery charging and an exemplary embodiment of the present disclosure is described below. According to an existing approach, a battery charger includes a "hard coded" charge algorithm. With this charge technique, digital or analog sensor data is obtained by the battery charger, and charge current is delivered to the battery based on pre-defined parameters contained within the battery charger. Using a 10-cell NiCad battery as an example, the charging operations may be performed as follows. First, the battery charger delivers C/2 constant current to the battery until the battery reaches a first temperature-compensated limit (e.g., nom. 14 v). Second, the battery charger delivers C/10 constant current to the battery until the battery reaches a second temperature-compensated limit (e.g., nom. 15.5 v). Third, charging terminates until the battery voltage falls to a third temperature-compensated limit (e.g., nom. 15.2 v).

In the above-described existing approach, the charging algorithm is hard coded in the battery charger. This is disadvantageous at least because upgrading such a platform to a new battery chemistry requires a second investment in a new charger algorithm. To upgrade a fleet of platforms requires a significant cost to modify the battery chargers simultaneously with the upgrade to the new battery. This, in turn, limits the desire to make incremental battery upgrades.

In contrast to the existing approach described above, the present disclosure contemplates various embodiments in which the control parameters of battery charger 105 are repartitioned to be contained within second memory 150 of first battery 110. According to one exemplary embodiment, the one or more first parameters are stored in second memory 150 of first battery 110 using a "universal" charge algorithm. In an exemplary embodiment, charge current is delivered to first battery 110 based on the one or more first parameters related to the at least one first characteristic of first battery 110. As a result of the repartitioning, battery charger 105 is able to work with any type of battery, regardless of its chemistry and charge, discharge, or life parameters.

Using a 10-cell NiCad battery as an example, system 100 in the example of FIG. 1 may operate as follows. Battery charger 105 may be communicatively coupled to first battery 110. Battery charger 105 obtains and verifies one or more first parameters related to at least one first characteristic of first battery 110. Non-limiting examples of the one or more parameters include:

| Example Parameters | |
|---|---|
| # of Cells | 10 |
| 1st-phase Charge current (A) | 5 |
| 1st-phase Charge type | CC |
| 1st-phase sensor 1 limit (nom.) | 14 |
| 1st-phase sensor 1 parameter | −.002 |
| 2nd-phase Charge current (A) | 1 |

After reading and verifying the one or more first parameters related to the at least one first characteristic of first battery 110, battery charger 105 performs one or more charging operations based on the obtained one or more first parameters. In the present example, battery charger 105 first delivers defined current to first battery 110 until the 1st phase charge conditions are met. Second, battery charger 105 delivers defined current to first battery 110 until the 2nd phase charge conditions are met. Third, battery charger 105 enters 3rd and 4th phases. Fourth, battery charger 105 re-enters 2nd phase when parameters align.

As evidenced by the above-described sequence of charging operations, the one or more charging operations performed by battery charger 105 on first battery 110 may change over time based on the one or more first parameters obtained by battery charger 105. In certain embodiments, battery charger 105 may obtain the one or more first parameters more than once. For example, battery charger 105 and first battery 110 may continuously (or at regular or irregular intervals) exchange information related to the one or more first parameters related to the at least one characteristic of first battery 110.

For example, second processing circuitry 145 of first battery 110 may be configured to periodically store updated values of the one or more first parameters related to the at least one first characteristic of first battery 110 in memory 150. The updated values may reflect a change in the at least one first characteristic of first battery 110. First processing circuitry 125 of battery charger 105 may be configured to periodically obtain the updated values of the one or more first parameters related to the at least one first characteristic of first battery 110. Battery charger 105 may modify the one or more charging operations it performs based on the obtained updated values of the one or more first parameters related to the at least one first characteristic of first battery 110.

Having a generic charger, such as battery charger 105, that operates based on one or more parameters specified by first battery 110 will advantageously allow a multitude of batteries to be maintained by battery charger 105, without modification to battery charger 105. Additionally, there will advantageously be no charger retrofit cost for battery charger 105 when new battery technology is added to a fleet because it is not necessary to match battery charger 105 to the battery during an upgrade. As new battery technologies are developed, the parameters for the new technology can be loaded into the memory devices of the battery, allowing it to be optimally maintained by battery charger 105.

FIGS. 2A and 2B illustrate schematic diagrams of battery charger 105 configured to operate with first battery 110 of a first type and second battery 210 of a second, different type, in accordance with certain embodiments. More particularly, FIGS. 2A and 2B illustrate two scenarios. FIG. 2A is the same as that illustrated in the example of FIG. 1, with battery charger 105 communicatively coupled to first battery 110 of a first battery type. In certain embodiments, battery charger 105 may be a battery controller. For purposes of example, the components, functionality, and interactions between battery charger 105 and first battery 110 are the same as those described above in relation to FIG. 1. For the sake of brevity, only the differences will be described.

FIG. 2B illustrates an example in which first battery 110 has been replaced with second battery 210. Second battery 210 includes third interface 240, third processing circuitry 245, one or more third memory devices 250, and one or more sensors 255. In the examples of FIGS. 2A and 2B, second battery 210 is a different type of battery than first battery 110. For example, second battery 210 may have a different battery chemistry, a different number of cells, or any number of different features from first battery 110. There may be any number of reasons why, in FIG. 2B, second battery 110 has replaced first battery 110. As described above, battery technology is changing rapidly, and new battery chemistries are being developed at an accelerating rate. Continuing the example of FIG. 1, system 100 of FIGS. 2A and 2B may be located in an aircraft (such as aircraft 115 described above). The operator of the aircraft may have determined that a change from first battery 110 to second battery 210 was advantageous to operation of the aircraft.

According to existing approaches in which a battery charger is designed to handle only a single type of battery, the change from first battery 110 to second battery 210 would result in significant problems. Because charge, discharge, and life parameters for the original battery type were contained within the battery charger's charging algorithm in existing approaches, the upgrade from first battery 110 to second battery 210 would have required a second investment in a new charger algorithm for second battery 210.

As described above, however, in the example embodiments herein the respective control parameters of battery charger 105 are repartitioned to be contained within first battery 110 and second battery 210. Thus, battery charger 105 is able to work with any battery, including first battery 110 and second battery 210, regardless of its chemistry and charge, discharge, or life parameters. The interaction of battery charger 105 and second battery 210 is described in more detail below.

In the example of FIG. 2B, second battery 210 replaces first battery 110. Second battery 210 is of a different type that first battery 110. Traditionally, this would require significant modification to battery charger 105 in order for battery charger 105 to function with second battery 210. According to the various embodiments described herein, however, battery charger 105 is able to work seamlessly with second battery 210 without modification, for example, to a charging algorithm of battery charger 105. This is achieved because, as described below, second battery 210 stores one or more second parameters related to at least one second characteristic of second battery 210 in one or more third memory devices 250. The one or more second parameters related to the at least one second characteristic of second battery 210 are stored in a universal format that is implemented by both first battery 110 and second battery 210.

In the example of FIG. 2B, first interface 120 of battery charger 105 is communicatively coupled to second battery 210. Battery charger 105 is configured to communicate with second battery 110 via first interface 120. For example, in certain embodiments battery charger 105 is configured to obtain, via first interface 120, one or more second parameters related to at least one second characteristic of second battery 210. Battery charger 105 may obtain the one or more second parameters related to the at least one second characteristic of second battery 210 in any suitable manner. For example, first processing circuitry 125 may utilize first interface 120 to read the one or more second parameters from one or more third memory devices 250 of second battery 210. The various features of first interface 120 described above in relation to FIG. 1 are equally applicable to the examples of FIGS. 2A and 2B. For example, first interface 120 may be configured to communicate with second battery 210 in any suitable manner using any suitable technology.

As described above, first processing circuitry 125 of battery charger 105 may be configured to perform any suitable operations of battery charger 105. In the example embodiment of FIG. 2B, first processing circuitry 125 is configured to obtain, via first interface 120, one or more second parameters related to at least one second characteristic of second battery 210. The one or more second parameters may be any suitable parameters or information. For example, in certain embodiments the one or more second parameters may comprise one or more of a charge parameter, a discharge parameter, and a battery life parameter. In certain embodiments, first processing circuitry 125 may be configured to verify the one or more second parameters related to the at least one second characteristic of second battery 210. First processing circuitry 125 is configured to perform one or more second charging operations based on the obtained one or more second parameters related to the at least one second characteristic of second battery 210.

As described above, memory 130 may include one or more rules controlling the operation of battery charger 105. For example, memory 130 may include rules relating to interpreting the one or more second parameters related to at least one second characteristic of second battery 210. As another example, memory 130 may include rules governing the one or more second charging operations performed by battery charger 105 for second battery 210. In certain embodiments, the rules relating to interpreting the one or more second parameters and/or governing the one or more second charging operations are the same as those described above in relation first battery 110. This is because, in certain embodiment, the one or more first parameters described above and the one or more second parameters in the example of FIG. 2B are stored in a universal (i.e., common) format that is implemented by both first battery 110 and second battery 210. This allows battery charger 105 to seamlessly transition between battery types without requiring modifications.

Second battery 210 includes third interface 240, third processing circuitry 245, one or more third memory devices 250, and one or more sensors 255. In the example embodiment of FIG. 2B, third interface 240 is communicatively coupled to battery charger 105. Second battery 210 is configured to communicate with battery charger 105 via third interface 240. For example, in certain embodiments second battery 210 is configured to communicate, via third interface 240, one or more second parameters related to at least one second characteristic of second battery 210.

Third interface 240 may be configured to communicate with battery charger 105 in any suitable manner using any suitable technology. For example, third interface 240 may be any suitable device operable to receive information from battery charger 105, transmit information to battery charger 105, perform suitable processing of the received or transmitted information, communicate to other devices (e.g., another battery charger), or any combination of the preceding. Third interface 240 represents any port or connection, real or virtual, including any suitable hardware and/or software, including protocol conversion and data processing capabilities, to communicate with battery charger 105. In certain embodiments, second interface 240 of second battery 210 may communicate with battery charger 105 through a wired, LAN, WAN, or other communication systems that allows second battery 210 to exchange information with battery charger 105. As a particular example, third interface 240 may be communicatively coupled to first interface 120 of battery charger 105 over a bus. Other implementations are possible.

In the example of FIG. 2B, third processing circuitry 245 is communicatively coupled to third interface 240, one or more third memory devices 250, and one or more sensors 255. Third processing circuitry 245 of second battery 210 may be configured to perform any suitable operations of second battery 210. For example, in certain embodiments third processing circuitry 245 of second battery 210 monitors the at least one second characteristic of second battery 210 using one or more sensors 255. Third processing circuitry 245 stores the one or more second parameters related to the at least one second characteristic of second battery 210 in the one or more third memory devices 250. As a further example, in certain embodiments third processing circuitry 245 is configured to periodically store updated values of the one or more second parameters related to the at least one second characteristic of second battery 210 in one or more third memory devices 250. The updated values for the one or more second parameters may reflect a change in the at least one second characteristic of second battery 210. In certain embodiments, first processing circuitry 125 of battery charger 105 may periodically obtain the updated values of the one or more second parameters related to the at least one second characteristic of second battery 210 and modify the one or more second charging operations based on the obtained updated values.

Third processing circuitry 245 is any electronic circuitry, including, but not limited to microprocessors, ASIC, ASIP, and/or state machines, that communicatively couples to third interface 240, one or more third memory devices 250, and one or more sensors 255 and controls the operation of second battery 210. Third processing circuitry 245 may be 8-bit, 16-bit, 32-bit, 64-bit or of any other suitable architecture. Third processing circuitry 245 may include an ALU for performing arithmetic and logic operations, processor registers that supply operands to the ALU and store the results of ALU operations, and a control unit that fetches instructions from one or more third memory devices 250 and executes them by directing the coordinated operations of the ALU, registers and other components. Third processing circuitry 245 may include other hardware and software that operates to control and process information. Third processing circuitry 245 executes software stored on one or more third memory devices 250 to perform any of the functions of second battery 210 described herein. Third processing circuitry 245 controls the operation and administration of second battery 210, for example by processing information received by one or more sensors 255 and information received from second interface 240 and/or one or more third memory devices 250. Third processing circuitry 245 may be a programmable logic device, a microcontroller, a microprocessor, any suitable processing device, or any suitable combination of the preceding. Third processing circuitry 245 is not limited to a single processing device and may encompass multiple processing devices.

One or more third memory devices 250 may be any suitable type of memory. One or more third memory devices 250 may store, either permanently or temporarily, data, operational software, or other information for third processing circuitry 245. Memory 250 may include any one or a combination of volatile or non-volatile local or remote devices suitable for storing information. For example, memory 250 may include RAM, ROM, magnetic storage devices, optical storage devices, or any other suitable information storage device or a combination of these devices. The software represents any suitable set of instructions, logic, or code embodied in a computer-readable storage medium. For example, the software may be embodied in memory 250, a disk, a CD, or a flash drive. In particular embodiments, the software may include an application executable by third processing circuitry 245 to perform one or more of the functions of second battery 210 described herein.

In the example of FIG. 2B, memory 250 may store one or more second parameters related to at least one second characteristic of second battery 210. For example, memory 250 may store one or more charge parameters, one or more discharge parameters, and one or more battery life parameters for second battery 210. The one or more second parameters may be stored in the universal format that is implemented by batteries of different types, such as first battery 110, thereby allowing battery charger 105 to read parameters of different types of batteries (e.g., both first battery 110 and second battery 210) without modification to battery charger 105. Said another way, the one or more parameters may be stored in a generic manner that is not specific to a particular charging algorithm associated with second battery 210.

Additionally, memory 250 may include one or more rules for controlling the operation of second battery 210. For example, memory 250 may include rules relating to interpreting information generated by one or more sensors 255. As another example, memory 250 may include rules governing the operations of third processing circuitry 245. These rules generally refer to logic, rules, algorithms, codes, tables, and/or other suitable instructions embodied in a computer-readable storage medium for operation of second battery 210.

One or more sensors 255 may perform any suitable sensing functions for second battery 210. For example, one or more sensors 255 may comprise: one or more temperature sensors that measure temperature; one or more current sensors that measure current; one or more voltage sensors that measure voltage; one or more pressure sensors that measure pressure; one or more strain gauges that measure strain; one or more electrolyte concentration sensors; and any other suitable types of sensors. In certain embodiments, battery life may be sensed based on a combination of one or more outputs of the various sensors described above.

Second battery 210 may be configured to provide electricity to one or more components, for example one or more components of an aircraft (e.g., aircraft 115 described above in relation to FIG. 1). In certain embodiments, second battery 210 may be co-located with battery charger 105. Second battery 210 may be any suitable type of battery that is different from the first battery type of first battery 110. For example, second battery 210 may be at least one of an alkaline battery, a lead acid battery, a lithium ion battery, a nickel metal hydride (NiMH) battery, or any other suitable type of battery or combination of the above-described battery technologies. In addition to the various elements of second battery 210 illustrated in the example of FIG. 2B, second battery 210 may include additional elements necessary for second battery 210 to function as described herein. For example, the present disclosure contemplates that second battery 210 may utilize any suitable battery chemistry type. Second battery 210 may include any suitable number of cells.

Generally, in operation battery charger 105 is communicatively coupled to second battery 210 as shown in the example of FIG. 2B. A connection is also made through which a current may pass. Battery charger 105 may provide charge current to second battery 210 in any suitable manner, for example via charging connection 135. In certain embodiments, battery charger 105 may charge second battery 210 wirelessly. Battery charger 105, via first interface 120, reads one or more second parameters related to at least one second characteristic of second battery 210. For example, battery charger 105 may read a memory location of memory 250 in second battery 210 to obtain the one or more second parameters related to the at least one second characteristic of second battery 210.

In certain embodiments, the one or more second parameters related to the at least one second characteristic of second battery 210 are stored in memory 250 of second battery 210 in a universal format that, for example, is not specific to a second charging algorithm associated with second battery 210 (and that is also not specific to the first charging algorithm associated with first battery 110).

Battery charger 105 performs one or more second charging operations on second battery 210 based on the obtained one or more second parameters related to the at least one second characteristic of second battery 210. The charging operations may be any suitable operations. For example, battery charger 105 may deliver charge current to second battery 210. As another example, battery charger 105 may determine that second battery 210 needs to be connected to the load and discharges.

The one or more second parameters may be any suitable information. For example, the one or more second parameters may be a charge parameter, a discharge parameter, or a battery life parameter. As described above, the present disclosure (in contrast to existing approaches in which charge, discharge, and life parameters for a single battery type are contained within the battery charger's charging algorithm) re-partitions the control parameters for battery charger 105 to be contained within second battery 210. By storing these parameters in the universal format that can be, for example, used by both first battery 110 of a first battery type and second battery 210 of a second, different, battery type, battery charger 105 is able to perform charging operations on different types of batteries without requiring modification to, for example, its software (e.g., charging algorithm). Thus, any battery, regardless of its chemistry and charge, discharge, or life parameters, can be charged by battery charger 105. Battery charger 105 is therefore capable of maintaining a wide variety of batteries, including second battery 210 and first battery 110 based on the data provided within second battery 210 and first battery 110, respectively.

Having a generic charger, such as battery charger 105, that operates based on one or more parameters specified by the battery (e.g., first battery 110 or second battery 210) will advantageously allow a multitude of batteries to be maintained by battery charger 105, without modification to battery charger 105. Additionally, there will advantageously be no charger retrofit cost for battery charger 105 when new battery technology is added to a fleet because it is not necessary to match battery charger 105 to the battery during an upgrade. As new battery technologies are developed, the parameters for the new technology can be loaded into the memory devices of the battery, allowing it to be optimally maintained by battery charger 105.

Figure 3:
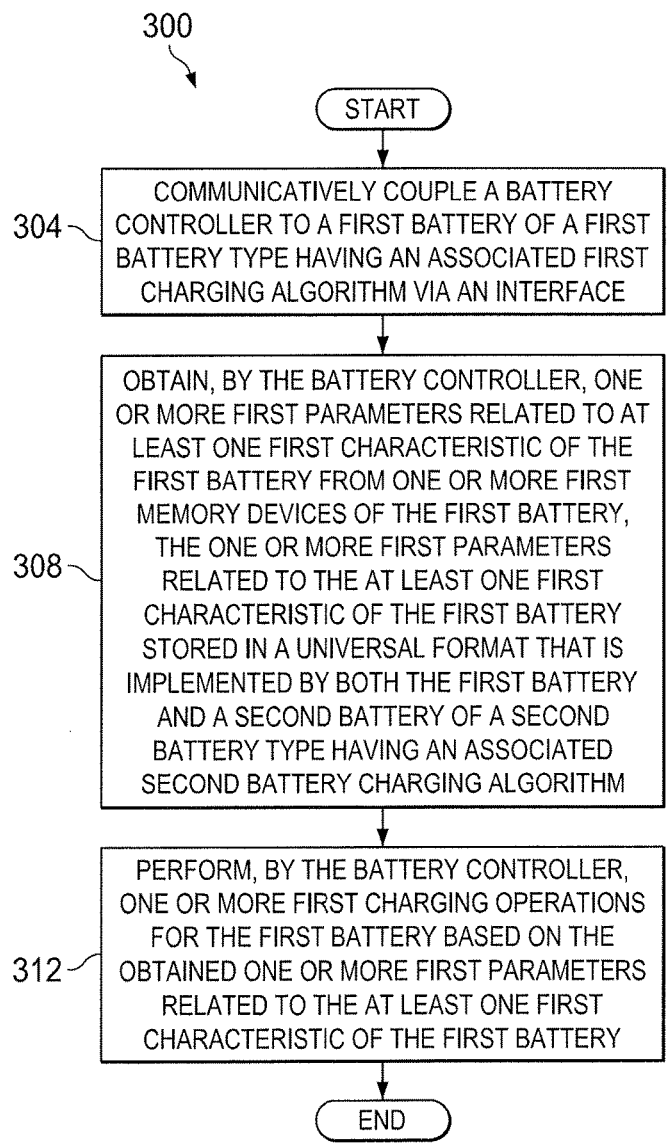
FIG. 3 is a flow diagram of a method that may be utilized by the charging system of FIG. 1, in accordance with certain embodiments.

FIG. 3 is a flow diagram of a method 300 that may be utilized by charging system 100, in accordance with certain embodiments. Method 300 begins at step 304, where a battery controller is communicatively coupled via an interface to a first battery of a first battery type having an associated first charging algorithm. In certain embodiments, the battery controller may be installed in an aircraft.

At step 308, one or more first parameters related to at least one first characteristic of the first battery are obtained by the battery controller from one or more first memory devices of the first battery, the one or more first parameters related to the at least one first characteristic of the first battery stored in a universal format that is implemented by both the first battery and a second battery of a second battery type having an associated second battery charging algorithm. In certain embodiments, the one or more first parameters may comprise one or more of: a charge parameter; a discharge parameter; and a battery life parameter. In certain embodiments, the method may comprise verifying the one or more first parameters related to the at least one first characteristic of the first battery.

At step 312, the battery controller performs one or more first charging operations for the first battery based on the obtained one or more first parameters related to the at least one first characteristic of the first battery.

In certain embodiments, the method may comprise communicatively coupling the battery controller to the second battery via the interface. The method may comprise obtaining, by the battery controller, one or more second parameters related to at least one second characteristic of the second battery from one or more second memory devices of the second battery, the one or more second parameters related to the at least one second characteristic of the second battery stored in the universal format that is implemented by both the first battery and the second battery. The method may comprise performing, by the battery controller, one or more second charging operations for the second battery based on the obtained one or more second parameters related to the at least one second characteristic of the second battery. In certain embodiments, the step of performing the one or more second charging operations for the second battery is performed without requiring modifications to the battery controller.

In certain embodiments, the method may comprise periodically obtaining updated values for the one or more first parameters related to the at least one first characteristic of the first battery, the updated values reflecting a change in the at least one first characteristic of the first battery. The method may comprise modifying the one or more first charging operations based on the obtained updated values of the one or more first parameters related to the at least one first characteristic of the first battery.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A system, comprising:
a battery controller, comprising:
a first interface configured to communicate with a first battery of a first battery type having an associated first charging algorithm and a second battery of a second, different battery type having an associated second charging algorithm; and
first processing circuitry configured to:
obtain, via the first interface, one or more first parameters related to at least one first characteristic of the first battery; and
perform one or more first charging operations based on the obtained one or more first parameters related to the at least one first characteristic of the first battery; and
the first battery, comprising:
one or more first memory devices configured to store the one or more first parameters related to the at least one first characteristic of the first battery, the one or more first parameters stored in a universal format that is implemented by both the first battery and the second battery; and
second processing circuitry configured to:
monitor the at least one first characteristic of the first battery using one or more sensors; and
store the one or more first parameters related to the at least one first characteristic of the first battery in the one or more first memory devices; and
a second interface communicatively coupled to the one or more first memory devices and the second processing circuitry, the second interface configured to communicate with the battery controller.

2. The system of claim 1, wherein:
the first processing circuitry of the battery controller is configured to:
obtain, via the first interface, one or more second parameters related to at least one second characteristic of the second battery, the one or more second parameters stored in one or more second memory devices of the second battery in the universal format that is implemented by both the first battery and the second battery; and
perform one or more second charging operations for the second battery based on the obtained one or more second parameters related to the at least one second characteristic of the second battery; and
wherein the first processing circuitry of the battery controller is configured to obtain the one or more second parameters related to the at least one second characteristic of the second battery and perform the one or more second charging operations for the second battery without requiring modification to the battery controller.

3. The system of claim 1, wherein:
the second processing circuitry of the first battery is configured to periodically store updated values of the one or more first parameters related to the at least one first characteristic of the first battery in the one or more first memory devices, the updated values for the one or more first parameters reflecting a change in the at least one first characteristic of the first battery.

4. The system of claim 3, wherein the first processing circuitry of the battery controller is configured to:
periodically obtain the updated values of the one or more first parameters related to the at least one first characteristic of the first battery; and
modify the one or more first charging operations based on the obtained updated values of the one or more first parameters related to the at least one first characteristic of the first battery.

5. The system of claim 1, wherein the one or more first parameters comprise one or more of:

a charge parameter;
a discharge parameter; and
a battery life parameter.

6. The system of claim 1, wherein the first processing circuitry of the battery controller is configured to verify the one or more first parameters related to the at least one first characteristic of the first battery.

7. The system of claim 1, wherein the first battery and the battery controller are installed in an aircraft.

8. An apparatus, comprising:
an interface configured to communicate with a first battery of a first battery type having an associated first charging algorithm and a second battery of a second battery type having an associated second charging algorithm;
processing circuitry configured to:
  obtain, via the interface, one or more first parameters related to at least one first characteristic of the first battery, the one or more first parameters related to the at least one first characteristic of the first battery stored in one or more first memory devices of the first battery in a universal format that is implemented by both the first battery and the second battery;
  perform one or more first charging operations for the first battery based on the obtained one or more first parameters related to the at least one first characteristic of the first battery;
  obtain, via the interface, one or more second parameters related to at least one second characteristic of the second battery, the one or more second parameters related to the at least one second characteristic of the second battery stored in one or more second memory devices of the second battery in the universal format that is implemented by both the first battery and the second battery; and
  perform one or more second charging operations for the second battery based on the obtained one or more second parameters related to the at least one second characteristic of the second battery.

9. The apparatus of claim 8, wherein the processing circuitry is configured to perform the one or more first charging operations for the first battery and the one or more second charging operations for the second battery without requiring modifications to the apparatus.

10. The apparatus of claim 8, wherein the processing circuitry is configured to:
periodically obtain updated values for the one or more first parameters related to the at least one first characteristic of the first battery, the updated values reflecting a change in the at least one first characteristic of the first battery; and
modify the one or more first charging operations based on the obtained updated values of the one or more first parameters related to the at least one first characteristic of the first battery.

11. The apparatus of claim 8, wherein the one or more first parameters related to the at least one first characteristic of the first battery comprise one or more of:
a charge parameter;
a discharge parameter; and
a battery life parameter.

12. The apparatus of claim 8, wherein the processing circuitry is configured to verify the one or more first parameters related to the at least one first characteristic of the first battery.

13. The apparatus of claim 8, wherein the apparatus is installed in an aircraft.

14. A method, comprising:
communicatively coupling a battery controller to a first battery of a first battery type having an associated first charging algorithm via an interface;
obtaining, by the battery controller, one or more first parameters related to at least one first characteristic of the first battery from one or more first memory devices of the first battery, the one or more first parameters related to the at least one first characteristic of the first battery stored in a universal format that is implemented by both the first battery and a second battery of a second battery type having an associated second battery charging algorithm; and
performing, by the battery controller, one or more first charging operations for the first battery based on the obtained one or more first parameters related to the at least one first characteristic of the first battery.

15. The method of claim 14, further comprising:
communicatively coupling the battery controller to the second battery via the interface;
obtaining, by the battery controller, one or more second parameters related to at least one second characteristic of the second battery from one or more second memory devices of the second battery, the one or more second parameters related to the at least one second characteristic of the second battery stored in the universal format that is implemented by both the first battery and the second battery; and
performing, by the battery controller, one or more second charging operations for the second battery based on the obtained one or more second parameters related to the at least one second characteristic of the second battery.

16. The method of claim 15, wherein the step of performing the one or more second charging operations for the second battery is performed without requiring modifications to the battery controller.

17. The method of claim 14, further comprising:
periodically obtaining updated values for the one or more first parameters related to the at least one first characteristic of the first battery, the updated values reflecting a change in the at least one first characteristic of the first battery; and
modifying the one or more first charging operations based on the obtained updated values of the one or more first parameters related to the at least one first characteristic of the first battery.

18. The method of claim 14, wherein the one or more first parameters comprise one or more of:
a charge parameter;
a discharge parameter; and
a battery life parameter.

19. The method of claim 14, further comprising verifying the one or more first parameters related to the at least one first characteristic of the first battery.

20. The method of claim 14, wherein the battery controller is installed in an aircraft.

* * * * *